(12) United States Patent
McGrade et al.

(10) Patent No.: US 11,445,719 B1
(45) Date of Patent: Sep. 20, 2022

(54) AUGMENTED RODENT TRAP DEVICE AND METHOD OF USE

(71) Applicants: Michael McGrade, West Covina, CA (US); Gavin McGrade, West Covina, CA (US)

(72) Inventors: Michael McGrade, West Covina, CA (US); Gavin McGrade, West Covina, CA (US)

( * ) Notice: Subject to any disclaimer, the term of this patent is extended or adjusted under 35 U.S.C. 154(b) by 0 days.

(21) Appl. No.: 17/362,035

(22) Filed: Jun. 29, 2021

(51) Int. Cl.
*A01M 23/30* (2006.01)
*A01M 23/00* (2006.01)
*A01M 23/24* (2006.01)

(52) U.S. Cl.
CPC ........ *A01M 23/005* (2013.01); *A01M 23/245* (2013.01); *A01M 23/30* (2013.01)

(58) Field of Classification Search
CPC .... A01M 23/005; A01M 23/00; A01M 23/30; A01M 23/24; A01M 23/245; A01M 1/14
USPC .......... 43/81, 81.5, 82, 83, 83.5, 114, 97, 58
See application file for complete search history.

(56) References Cited

U.S. PATENT DOCUMENTS

| | | | | |
|---|---|---|---|---|
| 1,464,559 A | * | 8/1923 | Britan | A01M 23/30 43/81 |
| 1,473,242 A | * | 11/1923 | Marshall | A01M 23/30 43/81 |
| 1,709,199 A | * | 4/1929 | Thayer | A01M 23/30 43/81 |
| 1,743,389 A | * | 1/1930 | Poncelet | A01M 23/245 43/81 |
| 3,023,539 A | * | 3/1962 | Emerson, Jr. | A01M 1/145 43/113 |
| 3,769,742 A | * | 11/1973 | Spain | A01M 23/30 43/81 |
| 3,913,259 A | * | 10/1975 | Nishimura | A01M 1/02 43/121 |
| 4,030,230 A | * | 6/1977 | Souza | A01M 23/30 43/81 |
| 4,212,128 A | * | 7/1980 | Vance | A01M 23/30 43/81 |
| 4,244,134 A | * | 1/1981 | Otterson | A01M 23/005 43/58 |
| 4,425,731 A | * | 1/1984 | Orlando | A01M 23/005 229/115 |

(Continued)

FOREIGN PATENT DOCUMENTS

| | | | | |
|---|---|---|---|---|
| DE | 599976 C | * | 7/1934 | ............ A01M 23/30 |
| DE | 603980 C | * | 10/1934 | ............ A01M 23/30 |

(Continued)

*Primary Examiner* — Darren W Ark
(74) *Attorney, Agent, or Firm* — Mark S Hubert

(57) ABSTRACT

A removeable, adhesive wrapper used to augment any existing rodent trap by affixation to the top, side and bottom faces of the rodent trap's operating platform. It is folded about the operating platform and connected to itself, leaving an adhesive layer facing up in the region of the bait station. When the rodent steps on it and stops to take the bait, they are no longer capable of quickly moving when they activate the trap's trigger and the kill bar of the rodent trap is released. Even if the rodent does not reach the bait station, their jiggling efforts to extricate their feet and/or lower body from the adhesive wrapper will activate the trigger. Once dead, the adhesive wrapper may be unfolded and wrapped around the dead rodent for disposal.

6 Claims, 9 Drawing Sheets

(56) References Cited

U.S. PATENT DOCUMENTS

| | | | | |
|---|---|---|---|---|
| 4,485,581 A * | 12/1984 | Roccaforte | A01M 1/02 43/121 |
| 4,779,374 A * | 10/1988 | Feldman | A01M 23/30 43/81 |
| 4,815,231 A * | 3/1989 | McQueen | A01M 1/14 43/114 |
| 4,819,371 A * | 4/1989 | Cohen | A01M 1/2011 43/131 |
| 5,148,624 A * | 9/1992 | Schmidt | A01M 23/30 43/81 |
| 5,172,512 A * | 12/1992 | Bodker | A01M 23/30 43/81 |
| 5,271,179 A * | 12/1993 | Cohen | A01M 1/2011 43/131 |
| 5,394,640 A * | 3/1995 | Musket | A01M 1/14 43/114 |
| 5,398,442 A * | 3/1995 | Musket | A01M 1/14 229/120.09 |
| 5,438,792 A * | 8/1995 | Monett | A01M 1/14 43/114 |
| 5,477,636 A * | 12/1995 | Musket | A01M 1/14 43/114 |
| 5,488,800 A * | 2/1996 | O'Hara | A01M 23/30 43/81 |
| 5,572,825 A * | 11/1996 | Gehret | A01M 1/02 229/120.11 |
| 6,119,391 A * | 9/2000 | Maconga | A01M 23/30 43/58 |
| 6,516,558 B1 * | 2/2003 | Lingren | A01M 1/14 43/107 |
| 6,618,985 B1 * | 9/2003 | Kaino | A01M 23/24 43/114 |
| 6,758,008 B1 * | 7/2004 | Thebolt | A01M 23/24 43/58 |
| 7,089,701 B2 * | 8/2006 | Frisch | A01M 23/005 43/114 |
| 7,117,631 B2 * | 10/2006 | Peters | A01M 23/30 43/81 |
| 7,162,832 B2 * | 1/2007 | Simpson | A01M 23/30 43/81 |
| 7,676,985 B1 * | 3/2010 | Perkins | A01M 1/026 43/114 |
| 7,954,275 B2 * | 6/2011 | Frisch | A01M 23/005 43/81 |
| 8,943,741 B2 * | 2/2015 | Watson | A01M 23/30 43/82 |
| 9,737,069 B1 * | 8/2017 | Giles, Jr. | A01M 23/005 |
| 10,051,855 B2 * | 8/2018 | Nelson | A01M 23/30 |
| 10,674,716 B1 * | 6/2020 | Bost | A01M 23/005 |
| 2001/0047612 A1 * | 12/2001 | Prince | A01M 1/04 43/58 |
| 2002/0104255 A1 * | 8/2002 | Hobson | A01M 1/14 43/114 |
| 2003/0070347 A1 * | 4/2003 | Lingren | A01M 1/2011 43/114 |
| 2005/0274056 A1 * | 12/2005 | Peters | A01M 31/008 43/58 |
| 2006/0156615 A1 * | 7/2006 | Hale | A01M 23/30 43/58 |
| 2006/0156617 A1 * | 7/2006 | Hale | A01M 23/30 43/81 |
| 2006/0283075 A1 * | 12/2006 | Feldhege | A01M 1/02 43/114 |
| 2010/0115824 A1 * | 5/2010 | Frisch | A01M 23/28 43/81 |
| 2010/0154288 A1 * | 6/2010 | Frisch | A01M 23/005 43/81 |
| 2010/0199544 A1 * | 8/2010 | Frisch | A01M 23/005 43/81 |
| 2013/0036658 A1 * | 2/2013 | Bayne | A01M 23/005 43/81 |
| 2014/0259878 A1 * | 9/2014 | Gilbert, II | A01M 1/145 43/113 |
| 2016/0360742 A1 * | 12/2016 | Nelson | A01M 23/245 |
| 2017/0245489 A1 * | 8/2017 | Hansson | A01M 23/30 |
| 2019/0116776 A1 * | 4/2019 | Gonzales | A01M 3/04 |
| 2019/0327952 A1 * | 10/2019 | Jalowiec | A01M 1/103 |
| 2020/0178514 A1 * | 6/2020 | Schurman | A01M 23/30 |
| 2020/0315156 A1 * | 10/2020 | Giacia | A01M 23/30 |
| 2021/0037803 A1 * | 2/2021 | Bost | A01M 1/14 |
| 2021/0037804 A1 * | 2/2021 | Bost | A01M 1/16 |
| 2021/0287490 A1 * | 9/2021 | Mailleux | A01M 1/14 |
| 2022/0110309 A1 * | 4/2022 | White | B31B 50/624 |

FOREIGN PATENT DOCUMENTS

| | | | | |
|---|---|---|---|---|
| DE | 29607701 U1 * | 7/1996 | | A01M 1/14 |
| JP | 2007097408 A * | 4/2007 | | |
| JP | 4078626 B2 * | 4/2008 | | |
| JP | 5960390 B2 * | 8/2016 | | |
| JP | 2017006125 A * | 1/2017 | | |
| JP | 6383026 B2 * | 8/2018 | | |
| JP | 6516750 B2 * | 5/2019 | | A01K 47/06 |
| JP | 2019170203 A * | 10/2019 | | |
| JP | 2020048445 A * | 4/2020 | | |
| JP | 6699970 B2 * | 5/2020 | | |
| JP | 3230678 U * | 2/2021 | | |
| JP | 2021090361 A * | 6/2021 | | |
| KR | 20010085241 A * | 9/2001 | | |
| KR | 101361181 B1 * | 2/2014 | | |
| WO | WO-9011684 A1 * | 10/1990 | | A01M 1/2016 |
| WO | WO-2015129976 A1 * | 9/2015 | | A01M 1/14 |
| WO | WO-2018144089 A1 * | 8/2018 | | A01M 23/245 |
| WO | WO-2019181881 A1 * | 9/2019 | | A01M 1/14 |
| WO | WO-2020117375 A1 * | 6/2020 | | A01M 1/02 |
| WO | WO-2021004613 A1 * | 1/2021 | | A01M 1/02 |

* cited by examiner

AUGMENTED RODENT TRAP DEVICE AND METHOD OF USE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to rodent traps, and more particularly to the technology of augmenting existing rodent traps.

BACKGROUND

The first rodent trap was patented in 1894 by an American inventor named William C. Hooker. It's patented "snap trap" embodiment is still the largest selling rodent trap on the market. However, rodents are much harder to catch than one would think. This is especially true if the rodent has encountered that same trap before. There are a plethora of ways by which a rodent can escape a trap and still get the bait. Since their reflexes are extremely quick, any movement or sound from a trap elicits an upward or backward hop by the rodent, keeping them away from the wound spring driven strike bar. Simply stated, if rodents were easy to catch in the existing conventional snap traps, there would not continue to be a stream of new rodent traps introduced to the market each year.

The problem is that the rodent must be free to approach the bait station part of the trap and get positioned under the strike bar yet not be free to move away or hop out of the circular path of the strike bar once they are correctly positioned. With other traps such as glue pad traps, the rodent is sufficiently retained by its feet, yet will chew their appendages off to escape—which is far from a humanitarian way to eradicate them. These are the quandaries.

Henceforth, an augmented rodent trap that prevents the rodent from escaping the strike bar would fulfill a long felt need in the industry. This new invention utilizes and combines known and new technologies in a unique and novel configuration to overcome the aforementioned problems and accomplish this.

BRIEF SUMMARY

In accordance with various embodiments, an augmented rodent trap that retains the rodent on the trap before the trap's activation is provided.

In one aspect, a replaceable augmentation device that can be adapted to, or directly mated to most rodent traps.

In another aspect, an inexpensive, humane trap for the eradication of rodents that dramatically raises the kill ratio per rodent/trap encounter.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
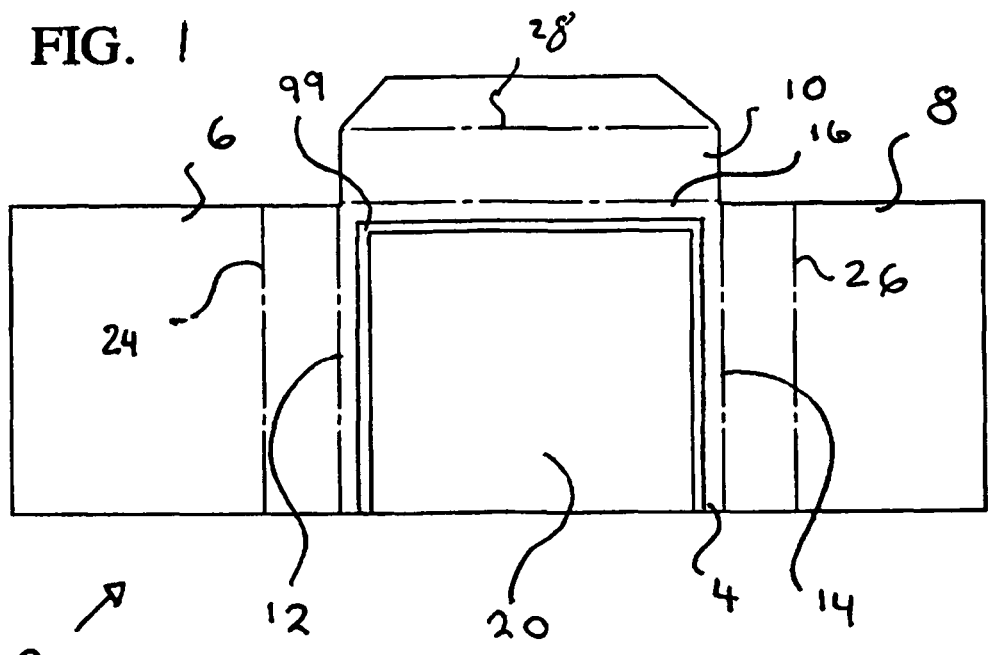
FIG. 1 is a top view of the trap adhesive wrapper.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "rodent" refers to mice, rats, moles, voles, squirrels and other animals characterized by a single pair of continuously growing incisors in each of their upper and lower jaws.

As used herein, the term "snap trap" refers to a type of spring loaded trap that releases a kill bar under torsional force that strikes the rodent across the body with enough force to snap the rodent's neck or torso instantly killing them.

The present invention relates to a novel design for a device that may be added to augment any rodent trap to enhance the percentage of eradication of the rodent. Basically, it retains the rodent in the "zone of strike" of the kill bar once it has entered the bait station portion of the trap by adding a removeable adhesive wrapper to the rodent trap. When the rodent walks onto the adhesive wrapper and stops at the bait station area, they are unable to release their feet. They will either touch the bait and activate the trigger or try to remove their feet and jiggle the trap enough to release the kill bar. This greatly increases the kill to visit ratio for rodents on a snap trap alone, and prevents the inhumane deaths that rodents endure when trapped on just an adhesive pad alone. However, perhaps the best features are that the adhesive wrapper will prevent the splattering of rodent guts and feces onto the platform of the rodent trap and will allow the touch free removal of the dead rodent by wrapping their body in the adhesive wrapper as it is removed from the bottom face of the rodent trap and folded over the body.

Figure 2:
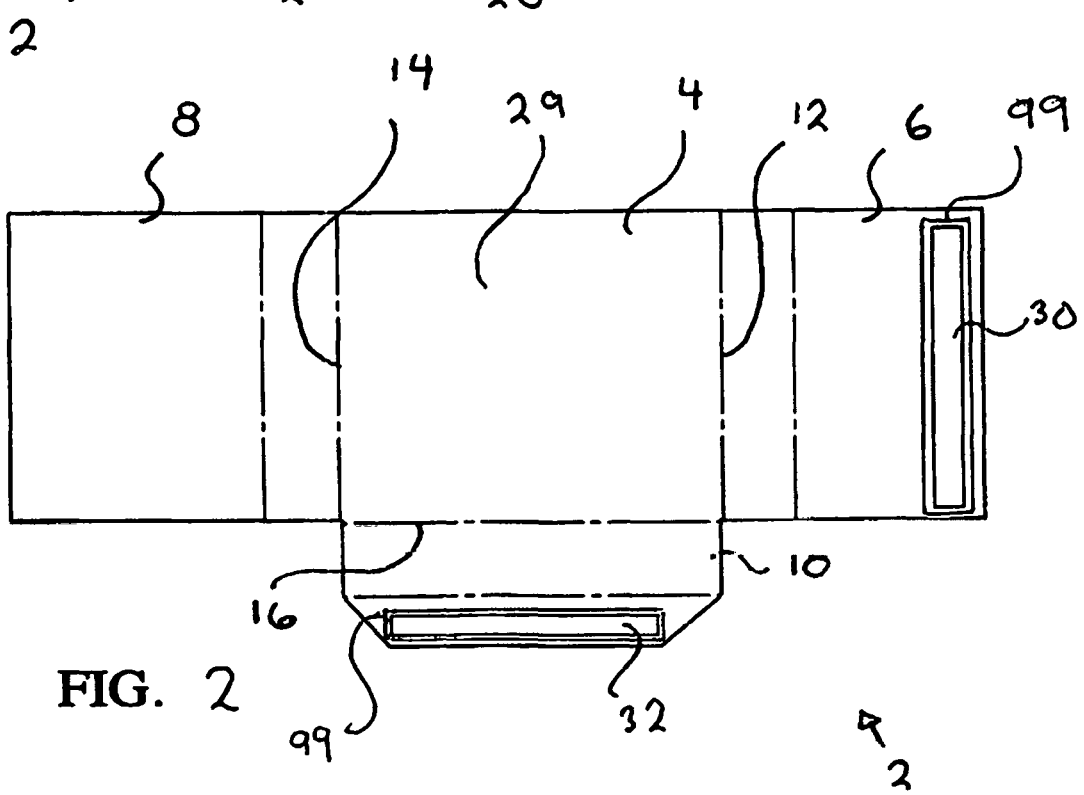
FIG. 2 is a bottom view of the trap adhesive wrapper.

Looking at FIGS. 1 and 2 it can be seen that the trap adhesive wrapper 2, in its unassembled configuration, is a planar substrate sheet (preferably of a paper, polymer or polymer coated paper) having a length, a width, an outer face 20, an inner face 29, a first creased fold line 12, a second creased fold line 14 and a third creased fold line 16 that define a central, rectangular, top plate 4, a first side wing 6, a second side wing 8 and an end wing 10. The first and second creased fold lines 12 and 14, extend across the entire width of the substrate sheet, and each resides perpendicular to the third creased fold line 16 but do not intersect the third creased fold line 16. The distance between the first and second creased fold lines 12 and 14 is greater than the length of the third creased fold line 16. The top plate 4 is bounded on three contiguous sides by the first second and third creased fold lines 12, 14 and 16. On a portion of the outer face 20 of the top plate 4 (FIG. 6) is an area of adhesive 22. This area of adhesive 22 may be sprayed, painted, rolled or calendared onto a portion of the outer face 20 if it is applied in a liquid or gel glue form, or it may be pressure applied if it is put on as a two sided adhesive pad or tape. There are a plethora of different adhesives and methods of applying the different adhesives onto the trap adhesive wrapper 2. The critical feature of the adhesive is that it is sticky enough to hold a rodent on its outer surface.

The three wings 6, 8 and 10 are not equal sizes but cooperate to wrap around a trap platform 18 (FIGS. 7, 8 and 9) and adhere to each other, or the bottom face of the rodent trap, so as to envelop one end and the top face of the trap. There is a specific order to the wrapping of the three wings 6, 8 and 10 to secure the wrapper 2 to the trap.

On each of the wings 6, 8 and 10 is an optional second, creased fold line that resides parallel to the other creased fold line on that wing. These fourth, fifth and sixth fold lines 24, 26 and 28 serve to define a side region between them and the first, second and third creased fold lines 12, 14 and 16. These side regions accommodate the thickness of the trap platform when wrapping the trap adhesive wrapper 2 about the sides and bottom faces of the trap platform 18.

On the inner face 29 of the second side wing 8 there is a first adhesive 30 and on the inner face of the end wing 10 there is a second adhesive 32. (See FIG. 2) Although depicted as adhesive strips on the inner faces of these wings, these adhesives need not directly reside on these wings, but rather are better described as residing between the inner faces of these wings and the outer faces of the wings they contact when folded into their operating configuration. These first and second adhesives may be also be made in a plethora of different types similarly to that of the area of adhesive 22, discussed herein. It is to be noted that in the preferred embodiment, both the area of adhesive 22 and the adhesives 30 and 32 incorporate releasable top sheets 99 that must be removed prior to first use. (See FIGS. 1, 2, 3 and 6.) (However, in alternate embodiments, for the adhesives 30 and 32, other types of sticky bonding substances may be utilized such as pressure sensitive glues and contact glues that eliminate the need for a releasable top sheet.) These top sheets prevent the trap adhesive wrapper 2 from sticking to anything it comes in contact with and allows groups of them to be packaged in a cost effective, close contact packaging. In alternate embodiments pressure sensitive adhesives may be utilized or two part contact adhesion regions may be used as is well known in the packaging industry.

Figure 3:
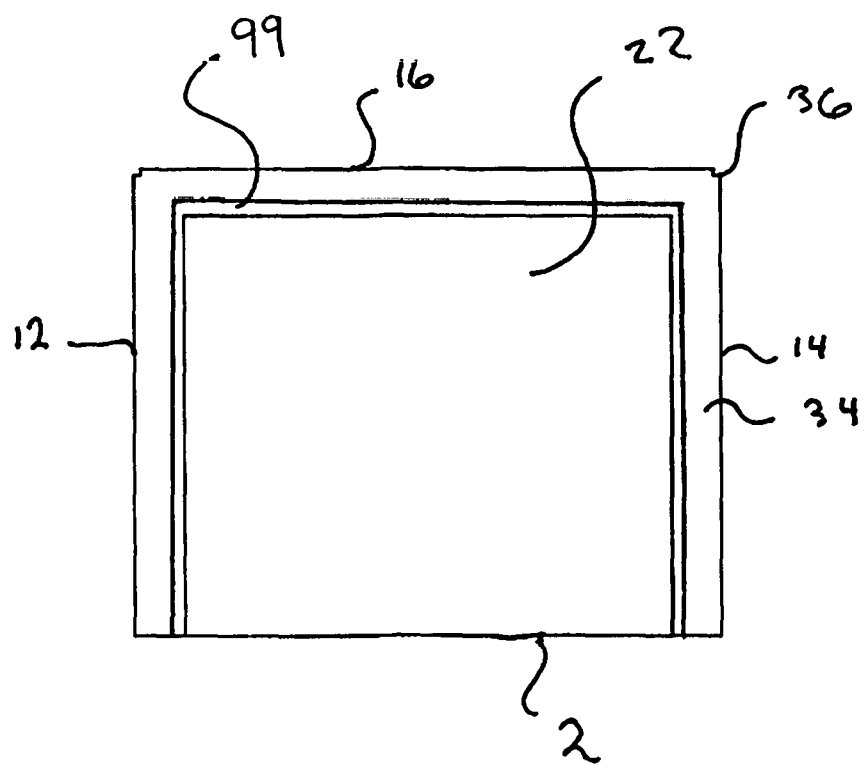
FIG. 3 is top view of the trap adhesive wrapper in an assembled configuration.
Figure 4:
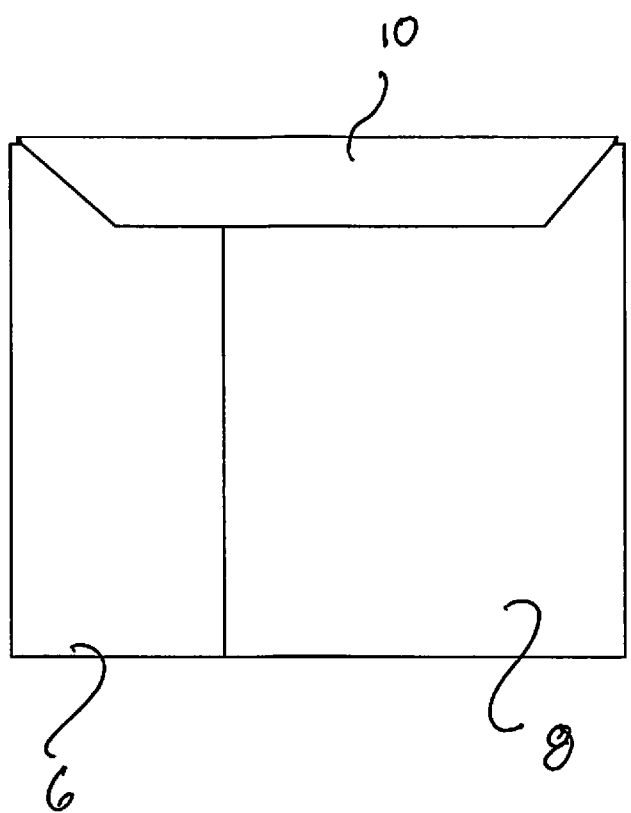
FIG. 4 is a bottom view of the trap adhesive wrapper in an assembled configuration.
Figure 5:
FIG. 5 is a side view of the trap adhesive wrapper in an assembled configuration.
Figure 6:
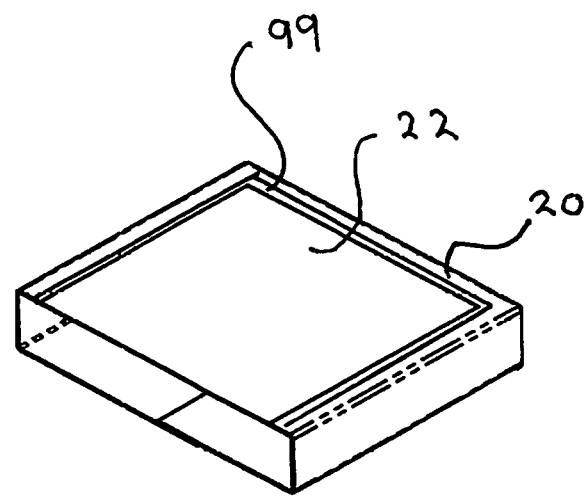
FIG. 6 is an end perspective view of the trap adhesive wrapper in an assembled configuration.
Figure 7:
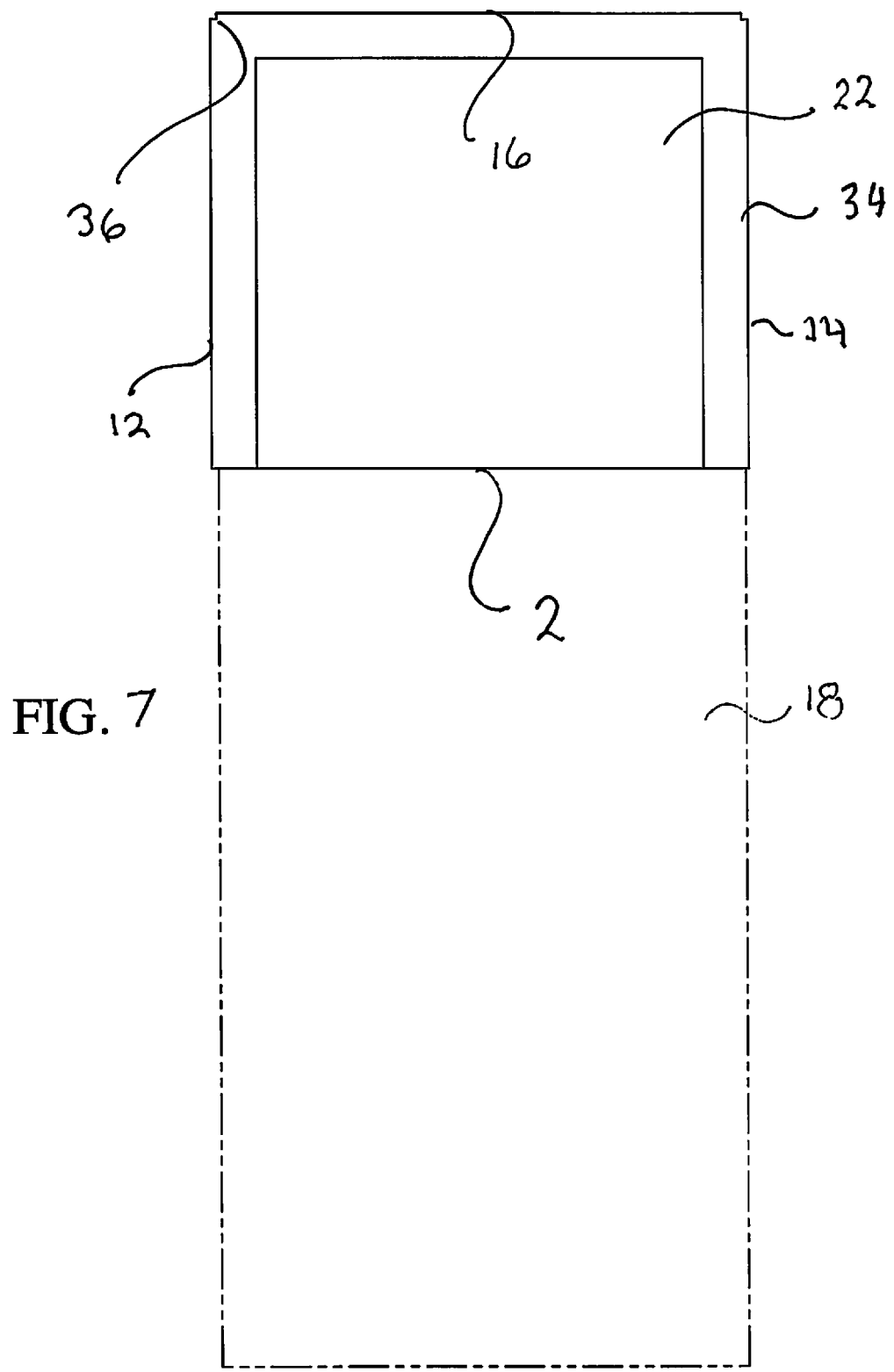
FIG. 7 is a top view of the trap adhesive wrapper on a trap platform.
Figure 8:
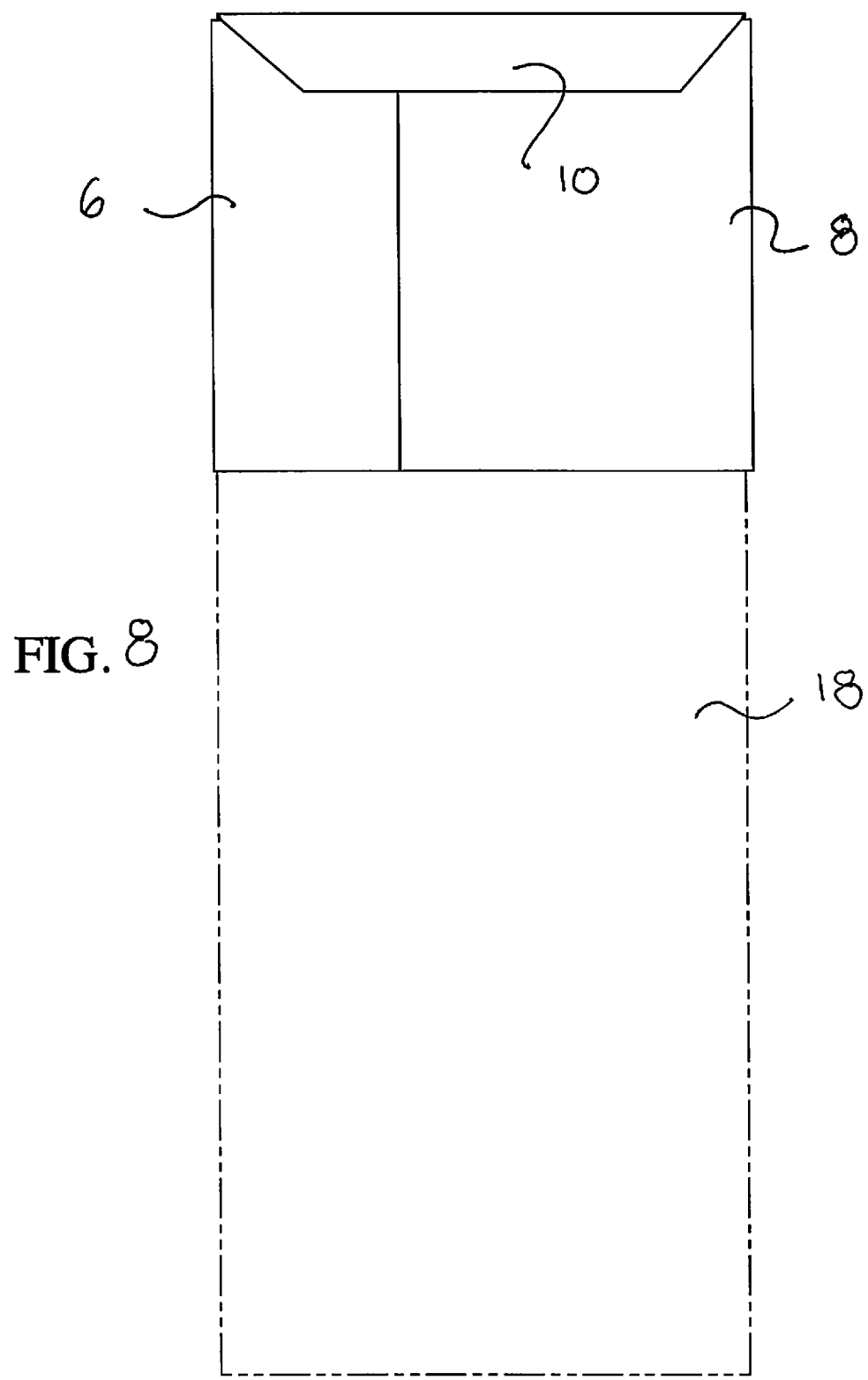
FIG. 8 is a bottom view of the trap adhesive wrapper on a trap platform.
Figure 9:
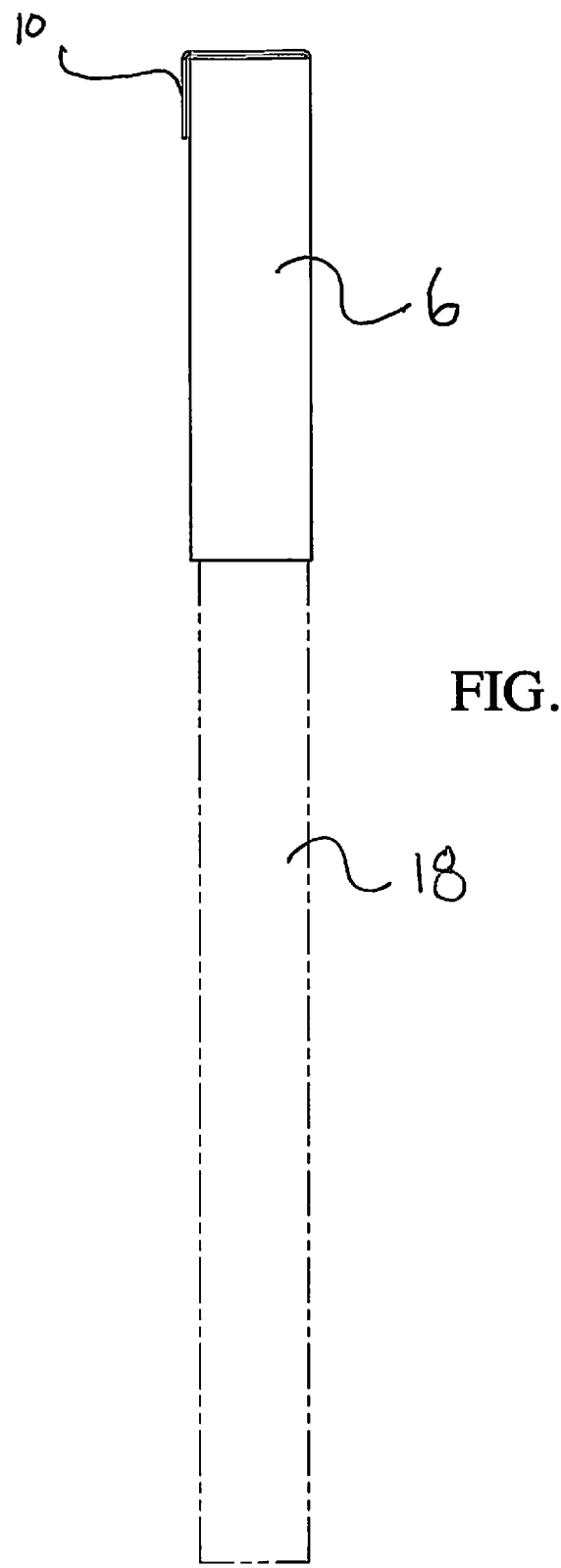
FIG. 9 is a side view of the trap adhesive wrapper on a trap platform.
Figure 11:
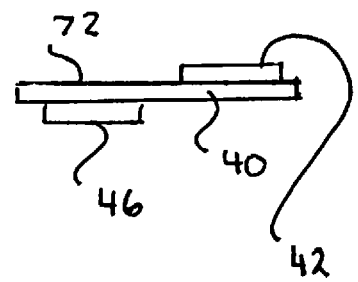
FIG. 11 is a side view of the alternate embodiment trap adhesive wrapper.
Figure 12:
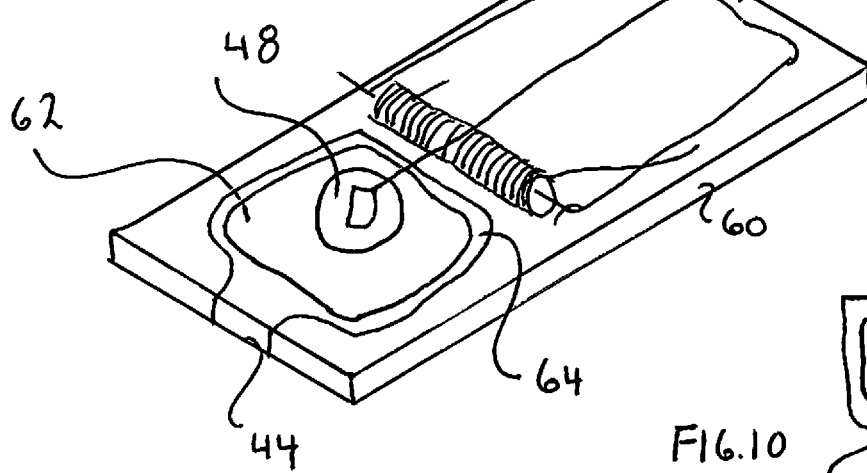
FIG. 12 is a top perspective view of the alternate embodiment trap adhesive wrapper installed on a snap trap.
Figure 10:
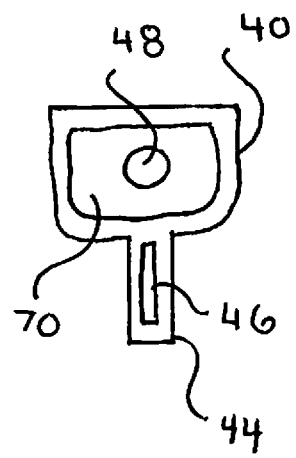
FIG. 10 is a bottom view of an alternate embodiment trap adhesive wrapper.
Figure 13:
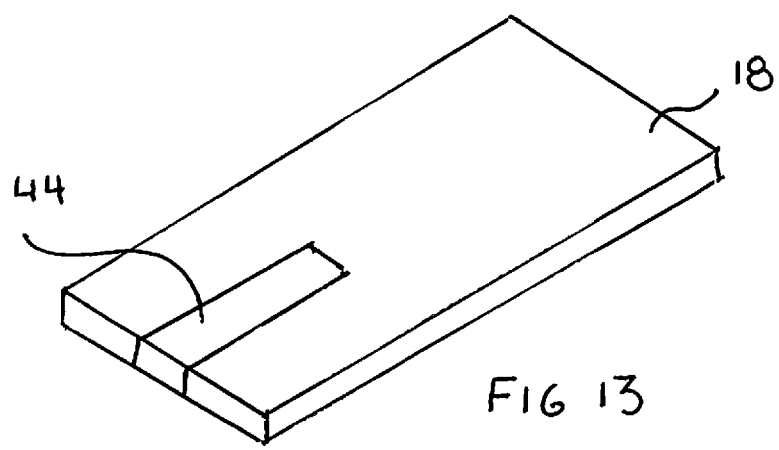
FIG. 13 is a bottom perspective view of the alternate embodiment trap adhesive wrapper installed on a snap trap.

FIGS. 3, 4 and 5 show the trap adhesive wrapper 2 by itself in its assembled configuration without a trap platform 18 from the top, bottom and side. FIGS. 7, 8 and 9 show the trap adhesive wrapper 2 in its assembled configuration from the top, bottom and side as it is installed on a trap platform 18. FIG. 6 shows an assembled trap adhesive wrapper 2 from an end view displaying the internal view.

From the top views of FIGS. 3 and 7 it can be seen that area of adhesion 22 does not extend to the edge of the top plate 4 and the first creased fold line 12, second creased fold line 14 and third creased fold line 16, but rather leaves a narrow non-sticky alley 34 about three sides of the perimeter of the top plate 4. This is for three reasons: to allow a margin of error in the placement of the area of adhesion 22, to give the rodent a small non-sticky region to place their forward feet onto the trap before leaping up into the top plate 4 with all four feet and their body where all four feet and underbelly become stuck to the top plate 4, and to allow the user to pick up and place the rodent trap without their fingers curling slightly about the sides of the trap and contacting the adhesive. Test have shown that if the area of adhesion extends to the edge of the top plate 4, the rodent will only get one foot onto the trap before realizing it is stuck and proceed no further.

FIGS. 3 and 7 illustrate that the edge corners 36 defined between the top plate 4 and the end wing 10 are inset from the first creased fold line 12, and second creased fold line 14 as the width of the end wing 10 (the third creased fold line 16) is less than the width of the top plate 4 (which is defined as the distance between the first creased fold line 12 and second creased fold line 14.) These offset edge corners 36 allow the end wing 10 and the first and second side wings 6 and 8 to be folded into shape for wrapping around the trap platform without buckling or wrinkling the top plate 4. In alternate embodiments the three creased fold lines 12, 14 and 16 may intersect or there may be concave cutouts at their intersections. Such embodiments would also allow the folding of the device 2 without causing any backline of the top plate 4.

FIGS. 4 and 8 illustrate that the top plate 4 is positioned at the distal end of the top face of the trap platform 18 with the third creased fold line 16 aligned with the back edge of the trap platform 18. The first side wing 6 is folded around the side and back faces of the trap platform 18 and its releasable top sheet 99 removed. The second side wing 8 is similarly folded so as to reside atop of the first side wing 6 and it is firmly pressed onto the region above the first adhesive 30, adhering the second side wing 8 onto the first side wing 6. Lastly, the releasable top sheet 99 is removed from the end wing 10 and the end wing 10 is folded around the end of the trap platform 18 and its adhesive 32 is forcibly pressed onto the second side wing 8 so as to form a wrapping around the distal end of the trap platform. As can be seen in FIG. 6, this adhesive wrapper forms an open cuboid with five faces and an open end, so as to form a concave wrapping that is sized for placement around a distal end of a rodent trap platform. To release the trap adhesive wrapper 2, it may just be slid rearwards off of the trap platform 18, however, if a dead rodent is present on the top plate 4, the process of assembling the trap adhesive wrapper 2 is reversed and the first and second side wings 6 and 8 are folded onto the top of the rodent carcass so that it may be extricated for disposal without touching it. Part of the novelty of this device 2 is that it allows rodent traps to be reused as much of the guts and feces from the exterminated rodent remain on the top plate 4 (which is removed and replaced by a new one) leaving the rodent trap clean for reuse.

FIGS. 5 and 9 merely illustrate the side view of an assembled trap adhesive wrapper 2. It is known that the placement of the first adhesive 30 may be varied between the side wings 6 and 8 and the second adhesive 32 may also be moved from the back face of the end wing 10 to the top face of the first side wing 12, the top face of the second side wing 14 or onto both of the side wing' top faces.

FIGS. 10-13 show an alternate embodiment trap adhesive wrapper 40. This style is developed for use with the common snap trap 60. Here, there is a generally rectangular, second top plate 42 formed on the second substrate sheet 72, having a linear tail wing 44 with a third adhesive 46 on its back face. The tail wing 44 extends from one of the four sides of the second top plate 42. The second top plate 42 has an orifice 48 defined therein that goes around the bait/trigger mechanism of the snap trap 60. Similar to the preferred embodiment trap adhesive wrapper 2, There is a second area of adhesion 62 and a second non-sticky peripheral alley 64, however here, the alley 64 resides around all four sides of the second top plate 42. There may be an optional fourth adhesive 70 on the back face of the substrate sheet to hold the second top plate 42 to the top face of the snap trap 60. Since the cost of a snap trap is so low, studies show people do not try to reuse them after a rodent has been eradicated and thus there is little incentive to make each of the second embodiment trap adhesive wrappers replaceable.

The simplified method of use follows the following steps:

Apply an adhesive region to the top face of a planar substrate sheet.

Affix a bottom face of said substrate sheet to a top face of an existing rodent trap.

Remove a releasable top sheet from said adhesive region.

While certain features and aspects have been described with respect to exemplary embodiments, one skilled in the art will recognize that numerous modifications are possible. Moreover, while the procedures of the methods and processes for building, attaching and using the rodent trap augmentation device described herein are described in a particular order for ease of description, unless the context dictates otherwise, various procedures may be reordered, added, and/or omitted in accordance with various embodiments. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. An adhesive wrapper forming a closed sleeve for affixation about an operating platform of a rodent trap, comprising:
    a planar substrate sheet having a width, a length, an outer face and an inner face;
    a first creased fold line extending across said width;
    a second creased fold line extending across said width and parallel to said first creased fold line;
    a third creased fold line perpendicular to said first and second creased fold lines;
    a top plate defined as a region on said substrate sheet bounded by said first, second and third creased fold lines;

an area of adhesive affixed to at least a portion of an outer face of said top plate;
a first side wing adjacent to said top plate and extending across a first side of said length;
a second side wing adjacent to said top plate and extending across a second side of said length;
an end wing adjacent to said top plate and extending across said width;
a first adhesive affixed between an inner face of said first side wing and an outer face of said second side wing when said first side wing is folded about said first creased fold line and said second side wing is folded about said second creased fold line to be positioned over said first side wing for engagement of said first adhesive to said inner face of said first side wing and said outer face of said second side wing;
a second adhesive affixed between an inner face of said end wing and an outer face of said first side wing and an outer face of said second side wing when said first and second side wings are folded about said first and second creased fold lines and said end wing is folded about said third creased fold line so as to engage said second adhesive with said first and second side wings;
wherein said adhesive wrapper forms an open cuboid with five faces and an open end, that is sized for placement around a distal end of said rodent trap platform.

2. An adhesive wrapper forming a closed sleeve for affixation about an operating platform of a rodent trap, comprising:
a planar substrate sheet having a width, a length, an outer face and an inner face;
a first creased fold line extending across said width;
a second creased fold line extending across said width and parallel to said first creased fold line;
a third creased fold line perpendicular to said first and second creased fold lines;
a top plate defined as a region on said substrate sheet bounded by said first, second and third creased fold lines;
an area of adhesive affixed to at least a portion of an outer face of said top plate;
a first side wing adjacent to said top plate and bounded by said first creased fold line;
a second side wing adjacent to said top plate and bounded by said second creased fold line;
an end wing adjacent to said top plate and bounded by said third creased fold line;
a first adhesive affixed between an inner face of said first side wing and an outer face of said second side wing when said first side wing is folded about said first creased fold line and said second side wing is folded about said second creased fold line to be positioned over said first side wing for engagement of said first adhesive to said inner face of said first side wing and said outer face of said second side wing;
a second adhesive affixed between an inner face of said end wing and an outer face of said first side wing and an outer face of said second side wing when said first and second side wings are folded about said first and second creased fold lines and said end wing is folded about said third creased fold line so as to engage said second adhesive with said first and second side wings;
wherein said adhesive wrapper forms an open cuboid with five faces and an open end, that is sized for placement around a distal end of said rodent trap platform.

3. The adhesive wrapper of claim 2 wherein said third creased fold line has a length that is less than a distance between said first creased fold line and said second creased fold line.

4. The adhesive wrapper of claim 3 further comprising:
a fourth creased fold line on said first side wing parallel to said first creased fold line;
a fifth creased fold line on said second side wing parallel to said second creased fold line; and
a sixth creased fold line on said end wing parallel to said third creased fold line.

5. The adhesive wrapper of claim 2 wherein said third creased fold line does not intersect said first or said second creased fold lines.

6. The adhesive wrapper of claim 5 further comprising;
an alley void of adhesive residing between said area of adhesive and said first, second and third creased fold lines.

* * * * *